(12) United States Patent
Lee et al.

(10) Patent No.: US 8,151,087 B2
(45) Date of Patent: Apr. 3, 2012

(54) CACHE MEMORY AND METHOD OF OPERATING THE SAME

(75) Inventors: Jung Keun Lee, Daejeon (KR); Sang Woo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1041 days.

(21) Appl. No.: 12/058,049

(22) Filed: Mar. 28, 2008

(65) Prior Publication Data

US 2009/0132784 A1 May 21, 2009

(30) Foreign Application Priority Data

Nov. 19, 2007 (KR) .......................... 10-2007-0117711

(51) Int. Cl.
*G06F 12/08* (2006.01)
(52) U.S. Cl. ................................. 711/216; 711/E12.018
(58) Field of Classification Search .......................... None
See application file for complete search history.

(56) References Cited

U.S. PATENT DOCUMENTS

| | | | |
|---|---|---|---|
| 6,895,493 B2 | 5/2005 | Steiss et al. | |
| 7,249,255 B2 | 7/2007 | Anand | |
| 2008/0028139 A1* | 1/2008 | Cypher | 711/108 |

OTHER PUBLICATIONS

Hans Vandierendonck, et al; "XOR-Based Hash Functions", IEEE Transactions on Computers, vol. 54, No. 7, Jul. 2005, pp. 800-812.

* cited by examiner

*Primary Examiner* — Edward Dudek, Jr.
*Assistant Examiner* — Ryan Dare
(74) *Attorney, Agent, or Firm* — Ladas & Parry LLP

(57) ABSTRACT

Provided are a cache memory using a linear hash function and a method of operating the same. The cache memory includes: a first hash function module for converting a main memory address received from a central processing unit (CPU) into a first index value using a first hash function; a second hash function module for converting the main memory address into a second index value using a second hash function; a first comparator for comparing a tag value of a data block located at the first index value in the first bank with a tag value of the main memory address; and a second comparator for comparing a tag value of a data block located at the second index value in the second bank with the tag value of the main memory address. In a pair of linear hash functions according to the present invention, each constructed with a 2m×m binary matrix, even if m is an odd number, each of the linear hash functions has the highest degree of interbank dispersion and avoids conflicts in row, column, diagonal, anti-diagonal, and rectangular patterns, so that a 2-way skewed associative cache can be constructed in relatively wide ranges.

6 Claims, 2 Drawing Sheets

$$H_1 = \begin{pmatrix} 0 & 1 & 0 & 0 & 1 \\ 0 & 0 & 1 & 1 & 0 \\ 1 & 0 & 1 & 0 & 0 \\ 1 & 1 & 0 & 0 & 0 \\ 1 & 0 & 0 & 0 & 0 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix}$$

$$H_2 = \begin{pmatrix} 0 & 0 & 0 & 0 & 1 \\ 0 & 0 & 0 & 1 & 0 \\ 0 & 0 & 1 & 0 & 1 \\ 0 & 1 & 1 & 0 & 0 \\ 1 & 0 & 0 & 1 & 0 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix}$$

FIG. 2

$$H_1 = \begin{pmatrix} 0 & 1 & 0 & 0 & 1 \\ 0 & 0 & 1 & 1 & 0 \\ 1 & 0 & 1 & 0 & 0 \\ 1 & 1 & 0 & 0 & 0 \\ 1 & 0 & 0 & 0 & 0 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix} \qquad H_2 = \begin{pmatrix} 0 & 0 & 0 & 0 & 1 \\ 0 & 0 & 0 & 1 & 0 \\ 0 & 0 & 1 & 0 & 1 \\ 0 & 1 & 1 & 0 & 0 \\ 1 & 0 & 0 & 1 & 0 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{pmatrix}$$

CACHE MEMORY AND METHOD OF OPERATING THE SAME

CROSS-REFERENCE TO RELATED APPLICATION

This application claims priority to and the benefit of Korean Patent Application No. 2007-117711, filed Nov. 19, 2007, the disclosure of which is incorporated herein by reference in its entirety.

BACKGROUND

1. Field of the Invention

The present invention relates to a cache memory and a method of operating the same and, more particularly, to a cache memory using a linear hash function and a method of operating the same.

2. Discussion of Related Art

A hash function is a function for converting a message with an arbitrary size into a message with a fixed size. In particular, a hash function that is a binary linear function expressed by a binary matrix is referred to as a linear hash function or an XOR-based hash function. For example, an arbitrary vector X may be transformed by a linear hash function H as follows:

$$X \cdot H = [x_3, x_2, x_1, x_0] \cdot \begin{pmatrix} 1 & 0 \\ 0 & 1 \\ 1 & 1 \\ 0 & 1 \end{pmatrix}$$
$$= [x_3 \oplus x_1, x_2 \oplus x_1 \oplus x_0]$$

The linear hash function H may be used as a hash function for each bank of a skewed associative cache to increase the hit rate of a cache memory.

The above-mentioned skewed associative cache is a method in which a cache memory is configured with multiple banks to increase a hit rate. In contrast to a set associative cache, the skewed associative cache operates a different hash function among the banks, such that even if data has the same memory address, the banks map the data to different indices. In particular, it is known that a 2-way skewed associative cache using two cache banks results in a higher hit rate than a 4-way set associative cache or a 2-way set associative cache.

In order that the 2-way skewed associative cache may ensure a high hit rate, a method of constructing a pair of linear hash functions having the maximum degree of interbank dispersion and being conflict-free in row, column, diagonal, anti-diagonal, and rectangular patterns has been proposed (H. Vandierendonck and K. De Bosschere, Xor-based hash functions, IEEE Trans. Computers, 54(7), pp. 800-812, 2005). Here, the degree of interbank dispersion between the pair of linear hash functions refers to how small the number of cases, where two values of the pair of hash functions are 0 at the same time, is. Accordingly, when the degree of interbank dispersion is maximum, the number of cases where two values of the pair of hash functions are 0 simultaneously is smallest. As described above, not only the degree of interbank dispersion between the linear hash functions but also conflict avoidance of each linear hash function in row patterns, column patterns, diagonal patterns, anti-diagonal patterns, and rectangular patterns are considered. For example, in order to increase a hit rate, it should be possible to store all data of adjacent memory addresses in a cache memory, which is associated with conflict avoidance in row patterns.

In a pair of linear hash functions, each constructed with a 2m×m binary matrix, when m is an even number, there is proposed the pair of linear hash functions that have the maximum degree of interbank dispersion and avoid conflicts in row, column, diagonal, anti-diagonal, and rectangular patterns. However, when m is an odd number, there is no pair of linear hash functions that meet the above-described requirements, so that construction of a cache memory is limited.

SUMMARY OF THE INVENTION

The present invention is directed to a cache memory using a pair of linear hash functions, each constructed with a 2m×m binary matrix, in which even if m is an odd number, the linear hash functions have the maximum degree of interbank dispersion and avoid conflicts in row, column, diagonal, anti-diagonal, and rectangular patterns, and a method of operating the cache memory.

One aspect of the present invention provides a cache memory including a first bank and a second bank comprising: a first hash function module for converting a main memory address received from a central processing unit (CPU) into a first index value using a first hash function; a second hash function module for converting the main memory address into a second index value using a second hash function; a first comparator for comparing a tag value of a data block located at the first index value in the first bank with a tag value of the main memory address; and a second comparator for comparing a tag value of a data block located at the second index value in the second bank with the tag value of the main memory address, wherein each of the first and second hash functions is a 2m×m binary matrix, and m is an odd number equal to or more than 5.

Another aspect of the present invention provides a method of operating a cache memory including a first bank and a second bank, the method including: receiving a main memory address from a central processing unit (CPU); converting the main memory address into a first index value using a first hash function; converting the main memory address into a second index value using a second hash function; comparing a tag value of a data block located at the first index value in the first bank with a tag value of the main memory address; comparing a tag value of a data block located at the second index value in the second bank with the tag value of the main memory address; and determining if a data value of the data block located at the first index value in the first bank or a data value of the data block located at the second index value in the second bank is to be transmitted based on the comparison results of the tag values, wherein each of the first and second hash functions is a 2m×m binary matrix, and m is an odd number equal to or more than 5.

BRIEF DESCRIPTION OF THE DRAWINGS

The above and other features and advantages of the present invention will become more apparent to those of ordinary skill in the art by describing in detail exemplary embodiments thereof with reference to the attached drawings in which:

FIG. 2 is a diagram illustrating a first hash function and a second hash function according to an exemplary embodiment of the present invention.

DETAILED DESCRIPTION OF EMBODIMENTS

Figure 1:
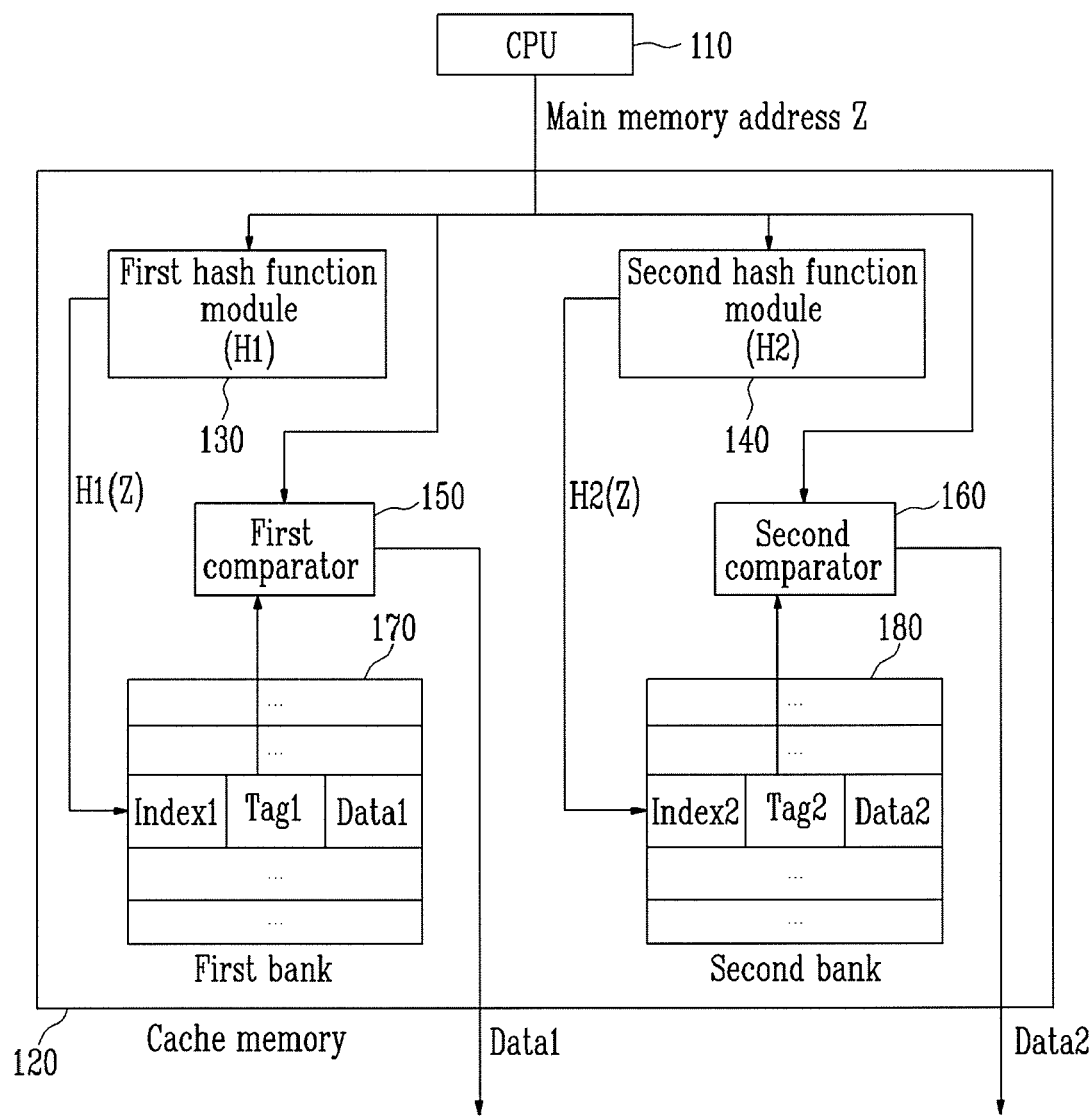
FIG. 1 is a block diagram of a cache memory according to an exemplary embodiment of the present invention.

FIG. 1 is a block diagram of a cache memory according to an exemplary embodiment of the present invention.

Referring to FIG. 1, a central processing unit (CPU) 10 requests a cache memory 120 to make access to data stored in a main memory address Z. Here, assuming that the main memory address Z is 2m-bit data, $0 \leq Z \leq 2^{2m}$.

A first hash function module 130 and a second hash function module 140 receive the main memory address Z and obtain a first index value H1(Z) and a second index value H2(Z) based on a first hash function H1 and a second hash function H2, respectively. The first hash function H1 and the second hash function H2 are a pair of 2m×m binary matrixes that are generated according to predetermined rules, and m is an odd number equal to or more than 5. The rules for generating the first and second hash functions H1 and H2 will be described later with reference to FIG. 2.

A first comparator 150 compares a tag value of a data block located at the first index value H1(Z) in the first bank 170 with a tag value of the main memory address Z. When the tag value of the data block located at the first index value H1(Z) is equal to the tag value of the main memory address Z, the cache memory 120 transmits a data value of the data block located at the first index value H1(Z) in the first bank 170 to the CPU 110.

Similarly, a second comparator 160 compares a tag value of a data block located at the second index value H2(Z) in the second bank 180 with the tag value of the main memory address Z. When the tag value of the data block located at the second index value H2(Z) is equal to the tag value of the main memory address Z, the cache memory 120 transmits a data value of the data block located at the second index value 180 to the CPU 110.

When the tag value of the main memory address Z is not equal to any one of the tag value of the data block located at the first index value H1(Z) and the tag value of the data block located at the second index value H2(Z), it is determined that a cache miss occurs. Thus, data located at the main memory address Z of a main memory is transmitted to the cache memory 120, and then transmitted to the CPU 110 and simultaneously, stored in the first or second banks 170 or 180 of the cache memory 120 according to the replacement policy of the cache memory 120.

FIG. 2 is a diagram illustrating a first hash function and a second hash function according to an exemplary embodiment of the present invention.

Referring to FIG. 2, a first hash function H1 and a second hash function H2 are exemplary functions for converting a 10-bit main memory address Z into a 5-bit index value and expressed by 10×5 binary matrixes, respectively. In the current embodiment, when the main memory address Z is [$Z_9$, $Z_8$, $Z_7$, $Z_6$, $Z_5$, $Z_4$, $Z_3$, $Z_2$, $Z_1$, $Z_0$], a first index value H1(Z) is [$Z_7 \oplus Z_6 \oplus Z_5 \oplus Z_4$, $Z_9 \oplus Z_6 \oplus Z_3$, $Z_8 \oplus Z_7 \oplus Z_2$, $Z_8 \oplus Z_1$, $Z_9 \oplus Z_0$], and H2(Z) is [$Z_5 \oplus Z_4$, $Z_6 \oplus Z_3$, $Z_7 \oplus Z_6 \oplus Z_2$, $Z_8 \oplus Z_5 \oplus Z_1$, $Z_9 \oplus Z_7 \oplus Z_0$]. The first and second hash functions H1 and H2 may be generated according to the following rules.

Each of the first hash function H1 and the second hash function H2 is a 2m×m binary matrix (here, m=2k+1 is an odd number equal to or more than 5). Each of the linear hash functions H1 and H2: $\{0,1\}^{2m} \rightarrow \{0,1\}$ may be generated as follows.

Initially, the first hash function H1=$(h1_{i,j})_{2m \times m}$ is constructed by juxtaposing an m×m matrix A=$(a_{i,j})_{m \times m}$ and an m×m identity matrix as expressed as follows:

$$h1_{i,j} = a_{i,j}, \quad \text{for } i \leq m$$
$$= 1, \quad \text{for } i > m, j = i - m$$
$$= 0, \quad \text{for other cases,}$$

wherein $a_{i,j}$ is obtained as follows:

$$a_{i,j} = 1, \quad \text{for } 1 \leq i \leq m, j = m + 1 - i$$
$$= 1, \quad \text{for } 1 \leq i \leq k, j = i + 1$$
$$= 1, \quad \text{for } i = k + 1, j = 1$$
$$= 1, \quad \text{for } i = k + 2, j = 1$$
$$= 0 \text{ or } 1, \quad \text{for } 1 \leq i \leq k - 2, i + 2 \leq j \leq k$$
$$= 0, \quad \text{for other cases.}$$

Also, the second hash function H2=$(h2_{i,j})_{2m \times m}$ is constructed by juxtaposing an m×m matrix B=$(b_{i,j})_{m \times m}$ and an m×m identity matrix as expressed as follows:

$$h2_{i,j} = b_{i,j}, \quad \text{for } i \leq m$$
$$= 1, \quad \text{for } i > m, j = i - m$$
$$= 0, \quad \text{for other cases,}$$

wherein $b_{i,j}$ is obtained as follows:

$$b_{i,j} = 1, \quad \text{for } 1 \leq i \leq m, j = m + 1 - i$$
$$= 1, \quad \text{for } k + 2 \leq i \leq m, j = i - 1$$
$$= 1, \quad \text{for } i = k + 1, j = m$$
$$= 0 \text{ or } 1, \quad \text{for } k + 4 \leq i \leq m, k + 2 \leq j \leq i - 2$$
$$= 0, \quad \text{for other cases.}$$

The first hash function H1 and the second hash function H2, which are generated according to the above-described rules, have the following two properties.

<Property 1>

Initially, each of the first and second hash functions H1 and H2 has the maximum degree of interbank dispersion. That is, $x \in \{0,1\}^{2m}$ that satisfies Ker(H1)∩Ker(H2)={0} and H1(x)=H2(x)=0 is nothing but 0.

<Property 2>

The first and second hash functions H1 and H2 are conflict-free in row, column, diagonal, anti-diagonal, and rectangular patterns. Specifically, the first and second hash functions H1 and H2 satisfy the following characteristics (1) to (5).

(1) The first and second hash functions H1 and H2 are conflict-free in the row patterns.

That is, assuming that $x \in \{0,1\}^{2m}$ are divided into m-bit row indices and m-bit column indices, when the row indices are the same, the first hash function H1 has a different value from the second has function H2, as in the following numerical expression.

Assuming that H=H1 or H2, when x1≠x2 and VecToInt(L(x1))=VectoInt(L(x2)), H(x1)≠H(x2).

Here, when $x \in \{0,1\}^{2m}$, $L(x) \in \{0,1\}^m$ is a binary vector obtained by selecting the first m number of x, and a VecToInt function is used to convert a binary vector with a length of m into a natural number less than $2^m$. That is, VecToInt([$a_m, \ldots a_i, \ldots a_1$])=$2^{m-1}a_m + \ldots + 2^{i-1}a_i + \ldots + a_1$.

(2) The first and second hash functions H1 and H2 are conflict-free in the column patterns.

That is, assuming that $x \in \{0,1\}^{2m}$ are divided into m-bit row indices and m-bit column indices, when the column indices are the same, the first hash function H1 has a different value from the second has function H2, as in the following numerical expression.

Assuming that H=H1 or H2, when $x1 \ne x2$ and VecToInt(M(x1))=VectoInt(M(x2)), $H(x1) \ne H(x2)$.

Here, when $x \in \{0,1\}^{2m}$, $M(x) \in \{0,1\}^m$ is a binary vector obtained by selecting the last m number of x.

(3) The first and second hash functions H1 and H2 are conflict-free in the diagonal patterns.

That is, when $i \ne j$, $H((IntToVec(i), IntToVec(i))) \ne H((IntToVec(j), IntToVec(j)))$.

Here, the IntToVec function is an inverse function of the VecToInt function, which converts a natural number less than $2^m$ into a binary vector with a length of m. That is, IntToVec $(2^{m-1}a_m + \ldots + 2^{i-1}a_i + \ldots + a_1) = [a_m, \ldots a_i, \ldots a_1]$.

(4) The first and second hash functions H1 and H2 are conflict-free in the anti-diagonal patterns.

That is, when $i \ne j$, $H((IntToVec(i), IntToVec(2^m-1-i))) \ne H((IntToVec(j), IntToVec(2^m-1-j)))$.

(5) The first and second hash functions H1 and H2 are conflict-free in the rectangular patterns.

That is, each value $r(0 \le r \le m)$ is shown by the following numerical expression.

When $x1, x2 \in \{0,1\}^{2m}$, $x1 \ne x2$, $0 \le VecToInt(L(x1))$, $VecToInt(L(x2)) < 2^r$, $0 \le VecToInt(M(x1))$, and $VecToInt(M(x2)) < 2^{m-r}$, $H(x1) \ne H(x2)$.

Therefore, the first and second hash functions H1 and H2 can be used in a 2-way skewed associative cache to increase a hit rate.

As described above, in a pair of linear hash functions generated according to the present invention, each constructed with a 2m×m binary matrix, even if m is an odd number, each of the linear hash functions can have the maximum degree of interbank dispersion and avoids conflicts in row, column, diagonal, anti-diagonal, and rectangular patterns, so that a 2-way skewed associative cache can be constructed in relatively wide ranges.

In the drawings and specification, there have been disclosed typical preferred embodiments of the invention and, although specific terms are employed, they are used in a generic and descriptive sense only and not for purposes of limitation. As for the scope of the invention, it is to be set forth in the following claims. Therefore, it will be understood by those of ordinary skill in the art that various changes in form and details may be made therein without departing from the spirit and scope of the present invention as defined by the following claims.

What is claimed is:

1. A cache memory including a first bank and a second bank, comprising:
   a first hash function module for converting a main memory address received from a central processing unit (CPU) into a first index value using a first hash function;
   a second hash function module for converting the main memory address into a second index value using a second hash function;
   a first comparator for comparing a tag value of a data block located at the first index value in the first bank with a tag value of the main memory address; and
   a second comparator for comparing a tag value of a data block located at the second index value in the second bank with the tag value of the main memory address,
   wherein each of the first and second hash functions is a 2m×m binary matrix, and m is an odd number equal to or more than 5, and
   wherein the first hash function is constructed by juxtaposing an m×m matrix $A=(a_{i,j})_{m \times m}$ and an m×m identity matrix, and $a_{i,j}$ is obtained by the following numerical expression:

$$\begin{aligned} a_{i,j} &= 1, && \text{for } 1 \le i \le m, j = m+1-i \\ &= 1, && \text{for } 1 \le i \le k, j = i+1 \\ &= 1, && \text{for } i = k+1, j = 1 \\ &= 1, && \text{for } i = k+2, j = 1 \\ &= 0 \text{ or } 1, && \text{for } 1 \le i \le k-2, i+2 \le j \le k \\ &= 0, && \text{for other cases,} \end{aligned}$$

wherein $m$ is $2k+1$.

2. The cache memory according to claim 1, wherein each of the first and second hash functions has the maximum degree of interbank dispersion and is conflict-free in row patterns, column patterns, diagonal patterns, anti-diagonal patterns, and rectangular patterns.

3. The cache memory according to claim 1, wherein the second hash function is constructed by juxtaposing an m×m matrix $B=(b_{i,j})_{m \times m}$ and an m×m identity matrix, and $b_{i,j}$ is obtained by the following numerical expression:

$$\begin{aligned} b_{i,j} &= 1, && \text{for } 1 \le i \le m, j = m+1-i \\ &= 1, && \text{for } k+2 \le i \le m, j = i-1 \\ &= 1, && \text{for } i = k+1, j = m \\ &= 0 \text{ or } 1, && \text{for } k+4 \le i \le m, k+2 \le j \le i-2 \\ &= 0, && \text{for other cases,} \end{aligned}$$

wherein $m = 2k+1$.

4. A method of operating a cache memory including a first bank and a second bank, comprising:
   receiving a main memory address from a central processing unit (CPU);
   converting the main memory address into a first index value using a first hash function;
   converting the main memory address into a second index value using a second hash function;
   comparing a tag value of a data block located at the first index value in the first bank with a tag value of the main memory address;
   comparing a tag value of a data block located at the second index value in the second bank with the tag value of the main memory address; and
   determining if a data value of the data block located at the first index value in the first bank or a data value of the data block located at the second index value in the second bank is to be transmitted based on the comparison results of the tag values,
   wherein each of the first and second hash functions is a 2m×m binary matrix, and m is an odd number equal to or more than 5, and
   wherein the first hash function is constructed by juxtaposing an m×m matrix $A=(a_{i,j})_{m \times m}$ and an m×m identity matrix, and $a_{i,j}$ is obtained by the following numerical expression:

$$\begin{aligned} a_{i,j} &= 1, & \text{for } 1 \le i \le m,\, j = m+1-i \\ &= 1, & \text{for } 1 \le i \le k,\, j = i+1 \\ &= 1, & \text{for } i = k+1,\, j = 1 \\ &= 1, & \text{for } i = k+2,\, j = 1 \\ &= 0 \text{ or } 1, & \text{for } 1 \le i \le k-2,\, i+2 \le j \le k \\ &= 0, & \text{for other cases,} \end{aligned}$$

wherein $m$ is $2k+1$.

5. The method according to claim 4, wherein each of the first and second hash functions has the maximum degree of interbank dispersion and is conflict-free in row patterns, column patterns, diagonal patterns, anti-diagonal patterns, and rectangular patterns.

6. The method according to claim 4, wherein the second hash function is constructed by juxtaposing an m×m matrix $B=(b_{i,j})_{m \times m}$ and an m×m identity matrix, and $b_{i,j}$ is obtained by the following numerical expression:

$$\begin{aligned} b_{i,j} &= 1, & \text{for } 1 \le i \le m,\, j = m+1-i \\ &= 1, & \text{for } k+2 \le i \le m,\, j = i-1 \\ &= 1, & \text{for } i = k+1,\, j = m \\ &= 0 \text{ or } 1, & \text{for } k+4 \le i \le m,\, k+2 \le j \le i-2 \\ &= 0, & \text{for other cases,} \end{aligned}$$

wherein $m = 2k+1$.

* * * * *